United States Patent
Cornelsen et al.

(10) Patent No.: US 12,045,447 B2
(45) Date of Patent: Jul. 23, 2024

(54) METHOD FOR EXTENDING THE OPERATING FUNCTIONALITY OF A FIELD DEVICE IN THE FIELD OF AUTOMATION TECHNOLOGY FROM ONE OPERATING DEVICE TO AT LEAST ONE OTHER OPERATING DEVICE

(71) Applicant: Endress+Hauser Process Solutions AG, Reinach (CH)

(72) Inventors: Norbert Cornelsen, Wieslet (DE); Carmen Roser, Steinen (DE); Ronja Binczyk, Rheinfelden (DE); Werner Thoren, Steinen (DE)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 18/040,081

(22) PCT Filed: Jul. 16, 2021

(86) PCT No.: PCT/EP2021/070014
§ 371 (c)(1),
(2) Date: Jan. 31, 2023

(87) PCT Pub. No.: WO2022/023084
PCT Pub. Date: Feb. 3, 2022

(65) Prior Publication Data
US 2023/0350548 A1 Nov. 2, 2023

(30) Foreign Application Priority Data

Jul. 31, 2020 (DE) ..................... 10 2020 120 297.0

(51) Int. Cl.
*G06F 3/0484* (2022.01)
*G08C 17/02* (2006.01)

(52) U.S. Cl.
CPC ........... *G06F 3/0484* (2013.01); *G08C 17/02* (2013.01)

(58) Field of Classification Search
CPC .............................. G06F 3/0484; G08C 17/02
See application file for complete search history.

(56) References Cited

U.S. PATENT DOCUMENTS

| 2013/0132591 A1* | 5/2013 | Damith | H04L 41/0253 709/227 |
| 2014/0277595 A1* | 9/2014 | Nixon | G06F 3/04817 700/17 |

(Continued)

FOREIGN PATENT DOCUMENTS

| CN | 209911926 U | 1/2020 |
| DE | 102014103426 A1 | 9/2014 |

(Continued)

*Primary Examiner* — Anil K Bhargava
(74) *Attorney, Agent, or Firm* — Kelly J. Smith; Endress+Hauser (USA) Holding, Inc.

(57) ABSTRACT

A method for extending the operating functionality of a field device from one operating device to another includes establishing a wireless communication connection between the operating device and the field device via a first communication interface, wherein the operating device executes at least one operating program having a plurality of display elements and operating functions via which the field device is serviced. The method includes initiating a search via a communication interface for an operating device. Where at least one other operating device is found, a wireless communication connection between the operating devices via one of the communication interfaces is established. The method also includes transmitting part of the display elements and/or operating functions to the other operating program of the other operating device and servicing the field (Continued)

device by means of the other operating device via the display elements and operating functions transmitted to the other operating program.

8 Claims, 2 Drawing Sheets

(56) References Cited

U.S. PATENT DOCUMENTS

| | | | | |
|---|---|---|---|---|
| 2015/0145654 A1* | 5/2015 | Gunzert | ............. | G05B 19/4183 340/12.5 |
| 2015/0287318 A1* | 10/2015 | Nair | ....................... | G06Q 10/10 340/5.6 |
| 2016/0132046 A1* | 5/2016 | Beoughter | ............ | G06F 16/248 700/17 |
| 2020/0319614 A1* | 10/2020 | Davis | .................. | G06F 3/04817 |
| 2023/0333540 A1* | 10/2023 | Braun | .................. | G05B 19/418 |

FOREIGN PATENT DOCUMENTS

| | | |
|---|---|---|
| DE | 102017220438 A1 | 5/2019 |
| DE | 102018132921 A1 | 6/2020 |

\* cited by examiner

METHOD FOR EXTENDING THE OPERATING FUNCTIONALITY OF A FIELD DEVICE IN THE FIELD OF AUTOMATION TECHNOLOGY FROM ONE OPERATING DEVICE TO AT LEAST ONE OTHER OPERATING DEVICE

CROSS-REFERENCE TO RELATED APPLICATIONS

The present application is related to and claims the priority benefit of DPMA Patent Application No. 10 2020 120 297.0 filed on Jul. 31, 2020, and International Patent Application No. PCT/EP2021/070014, filed Jul. 16, 2021, the entire contents of which are incorporated herein by reference.

TECHNICAL FIELD

The invention relates to a method for extending the operating functionality of a field device of automation technology from one operating device to at least one other operating device.

BACKGROUND

Known from the state of the art are field devices, which are used in industrial plants. In process automation technology, as well as in manufacturing automation technology, field devices are often applied. Referred to as field devices are, in principle, all devices, which are applied near to a process and which deliver, or process, process relevant information. Field devices are used for registering and/or influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or pipe or the fill level in a container. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected via communication networks, such as, for example, fieldbusses (Profibus®, Foundation® Fieldbus, HART®, etc.), with superordinated units. Normally, the superordinated units are control systems, or control units, such as, for example, a PLC (programmable logic controller). The superordinated units serve, among other things, for process control, process visualizing, process monitoring as well as for the commissioning of field devices. The measured values registered by field devices, especially by their sensors, are transmitted via the particular bus system to one or more superordinated units. In addition, also a data transmission from the superordinated unit via the bus system to the field devices is required, especially for configuring and parametering of field devices as well as for operation of actuators.

The servicing of a field device can occur via suitable operating devices or via the control system over the fieldbus. Modern field devices have, supplementally, a radio interface, via which the field devices can be serviced by means of mobile end devices (smartphone, tablets, etc.) or via wearables, such as smart glasses, for example, via the wireless protocol Bluetooth LE or via WiFi. For this, an app is installed in the mobile end devices, or in the wearables, by means of which a user can perform the servicing. Such an app is offered by the applicant under the mark "SmartBlue".

By means of the app, display elements are displayed on the mobile end devices. Such display elements include, for example, operating interfaces, menu structures or buttons with input fields (via which operating inputs can be input) or graphs, which visualize data of the field devices, for example, measured values or status information. Size constraints of the displays of such mobile end devices, especially in the case of smartphones, mean that sometimes not all display elements relevant for the user can be displayed, such that the user must, in given cases, scroll through a plurality of views or continually rearrange display elements. The use of a larger device, for example, a tablet having a larger display, is not always practical due to the size and weight.

Known is also the servicing of a field device with the help of a smart glasses, in the case of which the display elements are blended into the field of view and the performance of operating functions occurs in the field of view, for example, via gestures. Disadvantageous in such case is getting the positioning of the gestures right as well as the selecting, e.g. under difficult light conditions in the plant and positioning of the user.

SUMMARY

An object of the invention is to provide a method, which enables a simple and reliable servicing of field devices by means of operating devices with limited display sizes and/or under difficult environmental conditions.

The object is achieved by a method for extending the operating functionality of a field device of automation technology from one operating device to at least one other operating device, comprising
  establishing a wireless communication connection between the operating device and the field device via a first communication interface, wherein the operating device executes at least one operating program having a plurality of display elements and operating functionalities, via which the field device is serviced;
  initiating a seach via the first communication interface or via a second communication interface for other operating devices located in the vicinity and known to the operating device;
  in the case, in which at least one other operating device known to the operating device is found, establishing a wireless communication connection between the operating device and the other operating device via the first communication interface, or via the second communication interface, wherein another operating program is running on the other operating device;
  transmitting at least a part of the display elements and/or operating functions to the other operating program of the other operating device; and
  servicing the field device by means of the other operating device via the display elements and operating functions transmitted to the other operating program.

An advantage of the method of the invention is that a part of the display elements and/or the operating functions, which the operating program provides, can be transmitted to another operating device, which likewise executes the operating program. In other words, two operating devices can be used, which, in each case, display a part of the display elements, or with which, in each case, a part of the operating functions can be executed.

For this, another operating device is coupled with the operating device by means of a wireless communication connection. The display elements and the operating functions are transmited to the other operating device depending on the type of the known, and coupled, other operating device. The means that it is known to the operating software, which and how many display elements can and should be transmitted to the other operating device for display on it, and which operating functionalities the other device can perform. If more display elements are available for transmission than the other operating device can display, then the user can be presented with a list of all display elements available for transmission, whereupon the user can select those to be transmitted.

The term "servicing" is to be broadly construed here. Servicing includes a parametering of a field device, the setting of measurement modes of the field device, however, also maneuvering through menus, as well as selecting data of the field device to be displayed, for example, measured values or status/diagnostic information.

Field devices suitable for use in the method of the invention have already been indicated, by way of example, in the introductory part of the description.

In an advantageous embodiment of the method of the invention, it is provided that a Bluetooth LE protocol or a WiFi protocol is used for wireless communication connection between the operating device and the field device and/or between the operating device and the other operating device and/or for the search. However, also other suitable wireless protocols can be used.

In an advantageous embodiment of the method of the invention, it is provided that when two or more other operating devices are found, which are known to the operating device, the user, the operating device makes a selection of one or more other operating devices to be used for the following method steps. The user can, depending on purpose, bring along a number of devices. The operating program provides after the seach a list, which displays the found and compatible operating devices for selection. It can also be provided that the operating device transmits display elements and/or operating functionalities to two or more suitable other operating devices. It can be provided for this that unique display elements, and operating functions, are transmitted to each of the other operating devices, such that after the transmission given display elements and operating functions are not present on more than one operating device.

In an advantageous embodiment of the method of the invention, it is provided that when at least one other operating device not known to the operating device is found, the operating device performs a suitability test of the other operating device. The suitability test especially identifies the type of operating device, as well as the operating program running in the operating device. If these two factors are compatible for the operating device, and for the operating program, it is then checked, which of the display elements, and operating functions, can be transmitted to the other operating device. For this, for example, the operating device transmits an online query to a database of the producer of the operating program and retrieves the results. Alternatively, the operating program requests this information from the other operating device. The results of these queries are stored in both cases together with the name of the other operating device in the operating program of the operating device. Then, the other operating device is available for the method of the invention. It can be provided when the other operating device is provided only for the display of display elements that no operating program or only an operating program of reduced scope needs to be present.

In an advantageous first variant of the method of the invention, it is provided that the operating device and other operating device are, in each case, a mobile end device, wherein the operating device and the other operating device have, in each case, a touch screen.

In an advantageous embodiment of the first variant of the method of the invention, it is provided that one or more display elements are displayed by means of the touch screen of the first operating device, wherein one or more transmitted display elements, especially measured value functions of time of the field device, menu elements, and/or buttons, are displayed by means of the touch screen of the other operating device. In this way, the screen area used for display of the display elements can be enlarged, or extended.

In an advantageous embodiment of the first variant of the method of the invention, it is provided that one or more transmitted operating functions, especially the selecting of menu elements and/or buttons displayed on the touch screen, are performed by means of the touch screen of the other operating device. Thus, not only can buttons and/or menu elements be displayed on the other operating device, they also can be operated. For this, the other operating device does not need its own communication connection with the field device. The servicing occurs via the operating device, which receives the operating command from the other operating device and forwards it to the field device.

In an advantageous second variant of the method of the invention, it is provided that a smart glasses is used as operating device and wherein a mechanical input element is used as other operating device, especially a mechanical input element having at least one acceleration sensor, for example, a smart glove, a gamepad or a contact/movement sensitive piece of clothing. Used as smart glasses can be any suitable VR ("Virtual Reality") smart glasses, for example, the Oculus "Rift" or AR ("augmented Reality")/MR ("Mixed Reality")—, for example, the Microsoft "Hololens" or Google "Glass". Also, smart helmets fall under this concept. The smart glove is an input device in the form of a glove having a plurality of position sensors, for example, embodied for gesture control, and a plurality of operating elements, e.g. operating elements in the fingers, which are actuated by finger movement. A gamepad has a plurality of operating elements in the form of keys and joysticks and a plurality of acceleration sensors.

In an advantageous embodiment of the second variant of the method of the invention, it is provided that one or more display elements are displayed by means of the smart glasses and wherein at least one transmitted operating function is performed by means of the smart glove. Since a smart glasses, depending on type, only enables a limited operability, the operating functions are outsourced to the smart glove.

In an advantageous embodiment of the second variant of the method of the invention, it is provided that a navigation through display elements displayed on the smart glasses is used as transmitted operating function. The navigation occurs, for example, by a gesture control by means of the smart glove.

BRIEF DESCRIPTION OF THE DRAWINGS

The invention will now be explained in greater detail based on the appended drawing, the figures of which show as follows.

DETAILED DESCRIPTION

In both examples of embodiments, a field device FD is being serviced. In such case, this is a fill level measuring device, which, for example, determines by radar technology the fill level of a measured medium in a containment, for example, in a tank or in a silo. The invention can, however, be applied for other types of field device. Examples of these are given in the introductory part of the description.

The servicing occurs in both examples of embodiments via an operating device OD1. Operating device OD1 includes a first communication interface KI1, via which the operating device OD1 establishes a communication connection with the field device FD, especially via Bluetooth LE. Executed in the operating device OD1 is an operating program, via which a user OF can service the field device.

In the first example of an embodiment, the operating device OD1 is a mobile end device, in this instance a smart phone. The operating program is an app, for example, the "SmartBlue" app of the applicant. By means of this app, the field device FD can, upon established communication connection, be serviced. For this, display elements DE1 are displayed on the user interface, along with operating functions OF in the form of buttons. By input of parameter values into input fields, the operating functions OF effect parameter changes in the field device FD. Furthermore, the visualizing connected is displayed with the parameter value as display element DE1, for example, for the parameter "fill" a maximum value of the fill level in the containment, and for "empty" a minimum value of the fill level, as well as for "block" a block distance, after which an envelope curve is recorded.

Since the operating device OD1 has only a small display, the buttons and the display elements DE1 must be shifted continually, in order to display other operating functions and display elements. For increasing operating comfort, the operating device OD1 starts searching via a second communication interface, especially likewise using Bluetooth LE, for other operating devices. During the searching, the operating device OD2, likewise a mobile end device, for example, a tablet or other smart phone, is found. Since the other operating device OD2 is already known to the operating program of the operating device OD1, it couples automatically to the operating device OD1 via its communication interface KI3.

Then, the display element DE2 is transmitted to the other operating device OD2 and displayed there. In this example, display element DE2 is an envelope curve registered by the field device FD, which changes during the parametering by means of the first operating device OD1.

Figure 1:
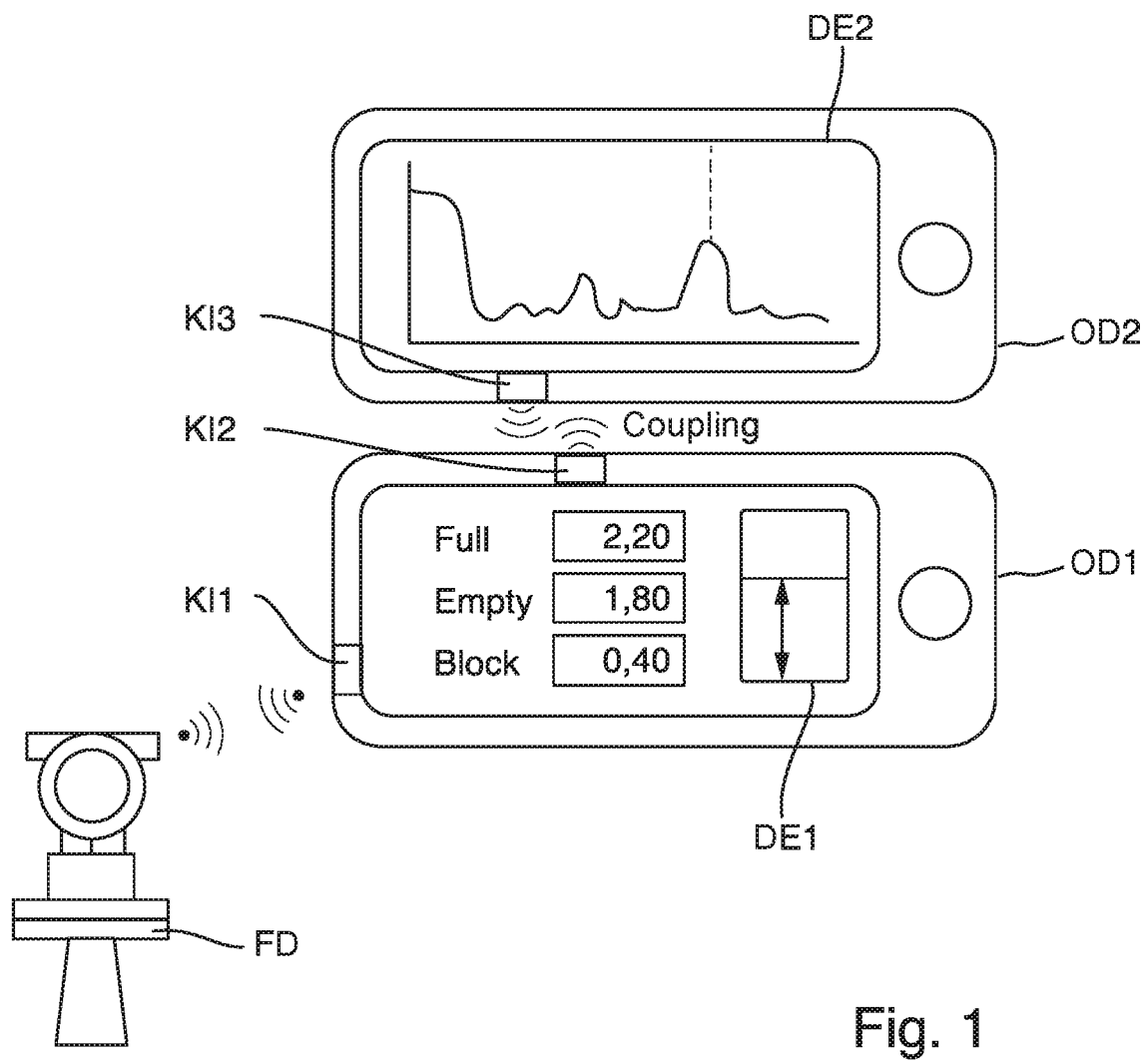
FIG. 1 shows an example of an embodiment of the method of the present disclosure.
Figure 2:
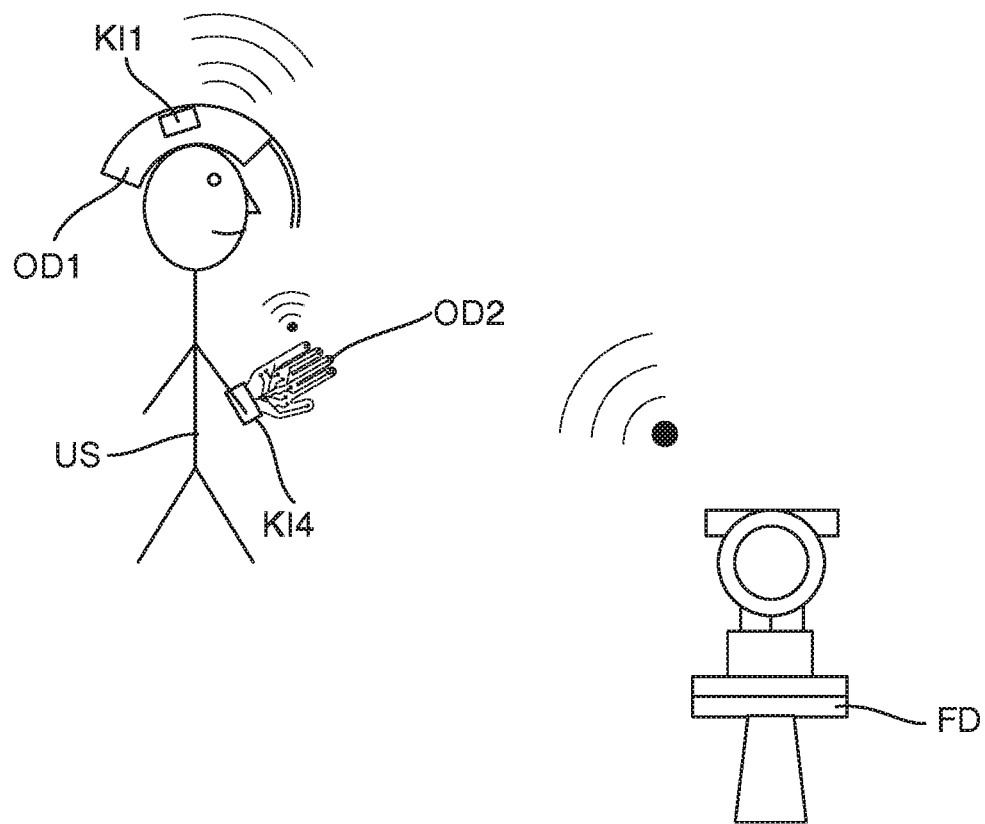
FIG. 2 shows a second example of an embodiment of the method of the present disclosure.

FIG. 2 shows a second example of an embodiment. In this case, the operating device OD1 is a smart glasses, for example, the Microsoft "HoloLens". This visualizes display elements, for example, menus or buttons. For servicing the field device, the operating device OD1 couples to a smart glove, which is the other operating device OD2. After the coupling, there are transmitted to the smart glove operating functionalities, which enable a servicing of the field device, for example, the selecting of entries displayed in the menus in the smart glasses using gesture control by means of the smart glove. Alternatively to the smart glove, a gamepad or a contact/movement sensitive piece of clothing, for example, a material glove with proximity sensors and/or position sensors, can be used.

In both examples of embodiments, a number of other operating devices can be coupled with the operating device OD1, such that display elements DE1, DE2 and/or operating functions can be transmitted to a number of other operating devices. In the case, in which another operating device is found, which is not known to the operating device OD1, a suitability test is performed. In the case of a successful suitability test, identification information of the other operating device is stored in the operating program of the operating device OD1.

The invention claimed is:

1. A method for extending the operating functionality of a field device of automation technology from one operating device to at least one other operating device, comprising:

establishing a wireless communication connection between the operating device and the field device via a first communication interface of the operating device, wherein the operating device executes at least one operating program having a plurality of display elements and operating functions, via which the field device is serviced;

initiating a search via the first communication interface or a second communication interface for other operating devices located in the vicinity and known to the operating device;

in the case in which at least one other operating device known to the operating device is found, establishing a wireless communication connection between the operating device and the other operating device via the first communication interface, or the second communication interface, wherein another operating program is running on the other operating device;

transmitting at least a part of the display elements or operating functions to the other operating program of the other operating device; and servicing the field device by means of the other operating device via the display elements and operating functions transmitted to the other operating program;

wherein when at least one other operating device not known to the operating devices is found, the operating device performs a suitability test of the other operating device.

2. The method of claim 1, wherein when two or more other operating devices were found, which are known to the operating device, the user, the operating device makes a selection of one or more other operating devices to be used.

3. The method of claim 1, wherein operating device and other operating device are, in each case, a mobile end device, wherein the operating device and the other operating device have, in each case, a touch screen.

4. The method of claim 1, wherein one or more display elements are displayed using the touch screen of the first operating device, wherein one or more transmitted display elements, especially measured value functions of time of the field device, menu elements, or buttons, are displayed by means of the touch screen of the other operating device.

5. The method of claim 1, wherein one or more transmitted operating functions, especially the selecting from on the touch screen displayed menu elements or buttons, are performed by means of the touch screen of the other operating device.

6. The method of claim 1, wherein smart glasses are used as operating device and wherein a mechanical input element is used as other operating device.

7. A method for extending the operating functionality of a field device of automation technology from one operating device to at least one other operating device, comprising:
- establishing a wireless communication connection between the operating device and the field device via a first communication interface of the operating device, wherein the operating device executes at least one operating program having a plurality of display elements and operating functions, via which the field device is serviced;
- initiating a search via the first communication interface or a second communication interface for other operating devices located in the vicinity and known to the operating device;
- in the case in which at least one other operating device known to the operating device is found, establishing a wireless communication connection between the operating device and the other operating device via the first communication interface, or the second communication interface, wherein another operating program is running on the other operating device;
- transmitting at least a part of the display elements or operating functions to the other operating program of the other operating device; and
- servicing the field device by means of the other operating device via the display elements and operating functions transmitted to the other operating program;
- wherein one or more display elements are displayed using the smart glasses and wherein at least one transmitted operating function is performed using a smart glove.

8. The method of claim 7, wherein a navigation through display elements displayed on the smart glasses is used as transmitted operating function.

* * * * *